United States Patent Office 3,222,319
Patented Dec. 7, 1965

3,222,319
ORGANOSILOXANE NITRATES
Walter Fink, Zurich, Switzerland, assignor to Monsanto Company, a corporation of Delaware
No Drawing. Filed June 16, 1961, Ser. No. 117,516
Claims priority, application Switzerland, June 24, 1960, 7,185/60
3 Claims. (Cl. 260—46.5)

It was found that novel organosiloxane nitrates can be obtained from organosilicon halides by conversion to the corresponding organosilanols and subsequent condensation. The organosilicon halides have the general formula $$(R)_a(R')_bSi(X)_c$$

wherein R is an aliphatic, cycloaliphatic or araliphatic hydrocarbon radical, preferably having not more than 9 carbon atoms, containing in all a nitrate group and a chlorine atom on at least two carbon atoms which are adjacent or separated by a vinylene group, R' is a hydrocarbon radical, preferably having not more than 9 carbon atoms, X is an acid anion, preferably halogen, $a$ is 1 or 2, $b$ is 0, 1 or 2 and $c$ is 1, 2 or 3, and the sum of $a+b+c$ corresponds to the valence of the silicon which is 4. R and R' radicals having oxygen, sulfur and nitrogen heteroatoms and other substituents as indicated in copending application Serial No. 104,797 filed April 24, 1961, now U.S. 3,127,431, describing the making of the organosilicon halides, are useful in making the organosiloxane nitrates of the invention as well as the hydrocarbon radicals not containing these other substituents.

The organic mono-, di- and tri-chlorosilanes showing nitrate groups and serving as starting material, possess at least one and at most two radicals which contain a nitrate group and chlorine and one to three halogen atoms attached to the silicon. Besides these substituents also organic radicals having no nitrate groups can possibly be present. Such compounds are not available on nitratization of the respective metallorganic hydroxyl compounds. But, they can be prepared by addition of halogen nitrate to olefinically unsaturated organosilicon halides according to the copending application Serial No. 104,797, filed April 24, 1961, now U.S. 3,127,431.

Some illustrative examples are:

α-chloro-β-nitratoethyltrichlorosilane,
α-chloro-β-nitratopropyltrichlorosilane,
β-chloro-γ-nitratopropyltrichlorosilane,
α-nitrato-β-chloro-β-phenylethyltrichlorosilane,
methyl-α-chloro-β-nitratoethyldichlorosilane,
phenyl-α-chloro-β-nitratoethyldichlorosilane,
bis-(α-chloro-β-nitratoethyl)-dichlorosilane,
methyl-bis-(α-chloro-β-nitratoethyl)-chlorosilane,
diethyl-α-chloro-β-nitratoethylchlorosilane,
diphenyl-α-chloro-β-nitratoethylchlorosilane, etc.

For the preparation of the novel compounds the organic halogenosilanes which contain nitrate groups are converted to the organosilanols, organosilanediols or organosilanetriols which still contain nitrate groups according to the scheme, $$(R)_a(R')_bSi(X)_c + cH_2O \rightarrow (R)_a(R')_bSi(OH)_c + cHX$$

The stability of the organohalogenosilanes which contain nitrate groups and also of the silanols which are formed on hydrolysis or on exchange of halogen for OH— groups is decreased with increased content of nitrate groups per silicon atom. For this, an analogous compound possessing three hydrocarbon radicals which each contain a nitrate group, can scarcely be prepared. The hydrolysis temperature is in conformance with the stability of the compounds to be reacted, i.e. one must consider the decomposition temperature of organohalogenosilanes which contain nitrate groups and carry out the hydrolysis at a temperature below the decomposition temperature. As a rule, it is between about −20° to +30° C. The hydrolysis is conveniently carried out in a low boiling solvent which is able to take up water such as ether, acetone, etc. with the calculated amount of water. Depending on the circumstances, other known methods for the conversion of chlorosilanes to silanols are applicable, but it must be considered hereby that the reaction and end-products which contain nitrate groups, display a strong oxidizing action, particularly at elevated temperature.

It is possible to isolate the organosilanols which are formed, however, the di- and triols condense easily to higher molecular products. The condensation is conveniently carried out at temperatures in the range of 0 to 80° C., and preferably between about 50 to 60° C., under reduced pressure after the solvent has been removed. Compounds of the formulas

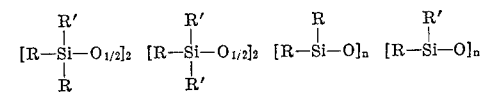

and

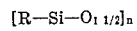

are formed according as are condensed exclusively mono-, bi- or tri-functional organosilanol units. In the above formulas $n$ indicates integral repeating structure.

As in the silicon chemistry is generally known, the molecular weight and the properties of the polysiloxane nitrates of invention may be extensively varied by addition of compounds having mono-functional groups and/or trifunctional groups to the compounds having bi-functional groups which latter only give linear chains. Possibly formed ring molecules can be transformed into linear polymers by known ways [Patnode and Wilcock, J. Am. Chem. Soc. 68, 358 (1946)].

The polysiloxane nitrates are according to the structure oils, pastes or glassy resins which are decomposed explosively at higher temperatures, and they are useful as explosives, propellants or as components in explosive or propellant compositions. Under restricted conditions to avoid decomposition they can be used for the same uses as are conventional siloxane polymers.

Example 1

Three parts of $NO_3CH_2CHClSiCl_3$ are dissolved in the 10- to 15-fold amount, by weight, of anhydrous ether at 22° C., and the necessary amount of water in the 5-fold amount of ether is added slowly with stirring. The stirring is continued for 1 hour at 22° C. Then, the solvent is distilled off from the hydrolysis product $$NO_3CH_2CHClSi(OH)_3$$

at 22° C./1.0×10⁻² to 1.0×10⁻⁴ mm. The remaining clear and slightly viscous residue can not be distilled. On standing, a fast progressing condensation occurs.

The condensation is carried out at 50–60° C./1.0×10⁻⁴ mm. and is complete after about 6 to 8 hours. The condensation product is a colorless glassy polymer which is decomposed explosively at about 210–250° C. On decomposition, a voluminuous mass is formed which consists mainly of $SiO_2$. The polymer has the following structure:

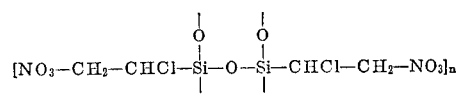

as could be concluded from analysis and infrared spectrum. It is soluble in ether, ketones, dioxane and insoluble in CCl₄, benzene, unpolar solvents.

*Analysis.*—$C_2H_3O_{4.5}NClSi$ calculated: C, 13.16%; H, 1.71%; N, 7.93%; Si, 15.90%. Found: C, 13.95%; H, 1.77%; N, 6.94%; Si, 15.87%.

Infrared spectrum in KBr/cm.$^{-1}$: 3650–3550 (w.), 2950 (w.), 1650 (v.s.), 1285 (v.s.), 1150–1070 (s.); 863 (s).

Example 2

Five to six parts by weight of $(NO_3CH_2CHCl)_2SiCl_2$ are dissolved in the 10- to 15-fold amount, by weight of ether at 60° C. The solution is brought to −20° C. and the necessary amount of water together with the 5-fold amount of ether is gradually added with stirring. The temperature is raised up to 0 to +50° C. within 1 hour while stirring is continued. Then, the solvent is distilled off from the hydrolysis product $(NO_3CH_2CHCl)_2Si(OH)_2$ at 0 to 22° C./$1.0 \times 10^{-2}$ to $1.0 \times 10^{-4}$ mm. The remaining clear and slightly viscous residue cannot be distilled.

The condensation is carried out at 22 to 50° C./$1.0 \times 10^{-4}$ mm. and is complete after about 10 to 15 hours. The condensation product is a colorless tough polymer which is decomposed explosively at 180 to 200° C. It displays a strong oxidizing property and has about the same solubility as the compound of Example 1. A voluminous mass is formed on decomposition which consists mainly of $SiO_2$. The product has the following structure:

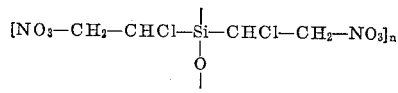

*Analysis.*—$C_4H_6O_7N_2Cl_2Si$ calculated: C, 16.4%; H, 2.06%; Si, 9.58%. Found: C, 17.38%; H, 2.29%; Si, 10.47%.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Siloxane polymers of the formulas

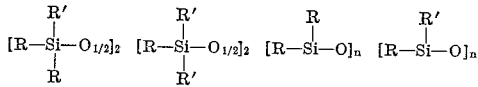

and

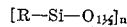

wherein R is selected from the class consisting of aliphatic, cycloaliphatic and araliphatic hydrocarbon radicals having not more than 9 carbon atoms and having a nitrate group and a chlorine atom on adjacent carbon atoms and aliphatic, cycloaliphatic and araliphatic hydrocarbon radicals having not more than 9 carbon atoms and having a nitrate group and a chlorine atom separated by a vinylene group, R' is a hydrocarbon radical having not more than 9 carbon atoms, and $n$ indicates an integral repeating structure.

2. Siloxane polymers of the following repeating structure

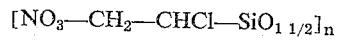

wherein $n$ indicates an integral repeating structure.

3. Siloxane polymers of the following repeating structure

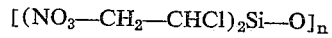

wherein $n$ indicates an integral repeating structure.

References Cited by the Examiner

UNITED STATES PATENTS

| | | | |
|---|---|---|---|
| 2,756,246 | 7/1956 | Burkhard | 260—46.5 |
| 2,985,680 | 5/1961 | Pepe | 260—448.2 |

OTHER REFERENCES

Rochow: Chemistry of the Silicones (N.Y., John Wiley and Sons, Inc., 2d ed., 1951), page 160.

LEON J. BERCOVITZ, *Primary Examiner.*

MILTON STERMAN, WILLIAM H. SHORT, MURRAY TILLMAN, *Examiners.*